(12) United States Patent
Brown et al.

(10) Patent No.: US 11,112,620 B2
(45) Date of Patent: Sep. 7, 2021

(54) CRAZING RESISTANT COATING AND METHOD THEREOF

(71) Applicant: Vision Ease, LP, Ramsey, MN (US)

(72) Inventors: Jeff Brown, St. Louis Park, MN (US); Michael Marshall, Andover, MN (US); John T. Moxon, Rogers, MN (US)

(73) Assignee: Vision Ease, LP, Ramsey, MN (US)

( * ) Notice: Subject to any disclaimer, the term of this patent is extended or adjusted under 35 U.S.C. 154(b) by 0 days.

(21) Appl. No.: 16/405,331

(22) Filed: May 7, 2019

(65) Prior Publication Data

US 2019/0265512 A1 Aug. 29, 2019

Related U.S. Application Data

(62) Division of application No. 15/074,149, filed on Mar. 18, 2016, now Pat. No. 10,317,701.

(60) Provisional application No. 62/135,069, filed on Mar. 18, 2015.

(51) Int. Cl.
| | |
|---|---|
| *G02B 1/11* | (2015.01) |
| *G02C 7/02* | (2006.01) |
| *G02B 1/14* | (2015.01) |
| *G02B 1/113* | (2015.01) |

(52) U.S. Cl.
CPC ............... *G02C 7/02* (2013.01); *G02B 1/113* (2013.01); *G02B 1/14* (2015.01)

(58) Field of Classification Search
CPC .. G02B 1/113; G02B 1/14; G02B 1/11; G02C 7/02; C03C 17/34; C09D 183/04; C23C 14/08; C23C 14/14; B05D 5/06
See application file for complete search history.

(56) References Cited

U.S. PATENT DOCUMENTS

| | | | |
|---|---|---|---|
| 2,333,051 | A | 10/1943 | Smith |
| 4,108,827 | A | 8/1978 | La Liberte |
| 4,139,694 | A | 2/1979 | Laliberte |
| 4,422,721 | A | 12/1983 | Hahn et al. |
| 4,793,669 | A | 12/1988 | Perilloux |
| 4,896,928 | A | 1/1990 | Perilloux et al. |
| RE33,729 | E | 10/1991 | Perilloux |

(Continued)

FOREIGN PATENT DOCUMENTS

| | | |
|---|---|---|
| CN | 103282823 A | 9/2013 |
| EP | 0145201 A1 | 6/1985 |
| JP | 2005-215038 A | 8/2005 |

OTHER PUBLICATIONS

Chilean Patent Office, Expert Report dated Mar. 7, 2019 in Australian Patent Application No. 201702347, 22 pages.

(Continued)

*Primary Examiner* — Balram T Parbadia
(74) *Attorney, Agent, or Firm* — Inskeep IP Group, Inc.

(57) ABSTRACT

An anti-reflective coating system configured to resist crazing resulting from applied compressive forces, and an optical article employing the anti-reflective coating system; and methods of forming the same. The methods include forming a first anti-reflective coating over a first surface of the optical article and applying a second anti-reflective coating over a second surface of the optical article, where the second anti-reflective coating has substantially the same reflectance than the first anti-reflective coating and a mechanical property distinct from the first anti-reflective coating.

13 Claims, 6 Drawing Sheets

(56) References Cited

U.S. PATENT DOCUMENTS

| | | |
|---|---|---|
| 5,059,561 A | 10/1991 | Ciolek et al. |
| 5,177,509 A | 1/1993 | Johansen et al. |
| 5,182,588 A | 1/1993 | Maurer et al. |
| 5,371,138 A | 12/1994 | Schaefer et al. |
| 5,400,175 A | 3/1995 | Johansen et al. |
| 5,521,765 A | 5/1996 | Wolfe |
| 5,719,705 A | 2/1998 | Machol |
| 5,751,481 A | 5/1998 | Dalzell et al. |
| 5,798,182 A | 8/1998 | LeFebvre et al. |
| 5,922,246 A | 7/1999 | Matsushita et al. |
| 5,949,518 A | 9/1999 | Belmares et al. |
| 6,419,873 B1 | 7/2002 | Buazza et al. |
| 6,464,484 B1 | 10/2002 | Powers et al. |
| 6,486,226 B2 | 11/2002 | Al-Akhdar et al. |
| 6,557,734 B2 | 5/2003 | Buazza et al. |
| 6,632,535 B1 | 10/2003 | Buazza et al. |
| 6,634,879 B2 | 10/2003 | Buazza et al. |
| 6,641,261 B2 | 11/2003 | Wang et al. |
| 6,770,692 B1 | 8/2004 | Kobayashi et al. |
| 6,777,459 B2 | 8/2004 | Al-Akhdar et al. |
| 6,926,510 B2 | 8/2005 | Buazza et al. |
| 6,939,899 B2 | 9/2005 | Buazza et al. |
| 6,960,312 B2 | 11/2005 | Powers et al. |
| 6,964,479 B2 | 11/2005 | Buazza et al. |
| 7,044,429 B1 | 5/2006 | Foreman et al. |
| 7,079,920 B2 | 7/2006 | Buazza et al. |
| 7,144,598 B2 | 12/2006 | Moravec et al. |
| 7,169,702 B2 | 1/2007 | El-Hibri |
| 7,217,440 B2 | 5/2007 | Jallouli et al. |
| 7,278,737 B2 | 10/2007 | Mainster et al. |
| 7,482,036 B2 | 1/2009 | Borghark et al. |
| 8,004,764 B2 | 8/2011 | Artsyukhovich et al. |
| 8,106,108 B2 | 1/2012 | Chen |
| 8,133,414 B2 | 3/2012 | Gallas et al. |
| 8,469,512 B2 | 6/2013 | Croft et al. |
| 8,541,526 B2 | 6/2013 | Jethmalani et al. |
| 9,057,887 B1 | 6/2015 | Jaglan |
| 2002/0142151 A1* | 10/2002 | Ochiai ............. B32B 17/10165 428/328 |
| 2006/0019114 A1 | 1/2006 | Thies et al. |
| 2008/0043200 A1* | 2/2008 | Ishak ................ G02C 7/104 351/159.65 |
| 2009/0120874 A1 | 5/2009 | Jensen et al. |
| 2009/0141357 A1 | 6/2009 | Kamura et al. |
| 2009/0189303 A1 | 7/2009 | Diggins et al. |
| 2010/0014144 A1 | 1/2010 | Ota |
| 2012/0019767 A1 | 1/2012 | Cadet et al. |
| 2012/0019915 A1 | 1/2012 | Yan et al. |
| 2013/0216807 A1 | 8/2013 | Wakefield et al. |
| 2013/0222913 A1 | 8/2013 | Tomoda et al. |
| 2014/0211150 A1 | 7/2014 | Suzuki |
| 2015/0131047 A1 | 5/2015 | Saylor et al. |
| 2016/0266281 A1 | 9/2016 | Marshall et al. |
| 2017/0102489 A1 | 4/2017 | Brown et al. |

OTHER PUBLICATIONS

European Patent Office, Extended European Search Report dated Oct. 4, 2018 in European Patent Application No. 16765845.9, 8 pages.

WIPO, U.S. International Search Authority, International Search Report and Written Opinion dated Jun. 9, 2016 in International Patent Application No. PCT/US2016/023206, 9 pages.

Johnson et al., Optical Constants of the Noble Metals, Physical Review B. vol. 6, No. 12. Dec. 15, 1972, Retrieved from internet: <https://www.clearrice.edu/elec603/spring2008/Selecting_a_Paperfiles/Phys%20%20Rev% 20%20B%201972%20Johnson.pdf> p. 4374.

Gracia et al., SiO2/TiO2 thin films with variable refractive index prepared by ion beam induced and ion beam induced and plasma enhanced chemical vapor deposition. Thin Solid Filmc 600. Dec. 16, 2005. Retrieved from internet: <http://sincaticmse.csic.es/articulosiTSF2006_500_19_gracia.pdf> p. 19.

IP Australia, Examiner's Report dated Oct. 14, 2020 in Australian Patent Application No. 2016232772, 4 pages.

IP Australia, Examiner's Report dated Jun. 30, 2020 in Australian Patent Application No. 2016232772, 5 pages.

INPI, Examiner's Report dated Dec. 4, 2019 in Brazilian Patent Application No. 1120170199491 (with English translation), 12 pages.

China National Intellectual Property Administration, Office Action dated Apr. 2, 2020 in Chinese Patent Application No. 201680026688.8 (with English translation), 13 pages.

* cited by examiner

CRAZING RESISTANT COATING AND METHOD THEREOF

RELATED APPLICATIONS

This application is a divisional of U.S. patent application Ser. No. 15/074,149 filed Mar. 18, 2016 entitled Crazing Resistant Coating And Method Thereof, which claims priority to U.S. Provisional Application Ser. No. 62/135,069 filed Mar. 18, 2015, entitled Crazing Resistant Coating and Method Thereof, both of which are hereby incorporated herein by reference in their entireties.

FIELD OF THE INVENTION

The present invention relates to the coating of optical lenses and, more particularly, to anti-reflective coatings systems that are resistant to crazing and methods of forming the same.

BACKGROUND OF THE INVENTION

Optical articles, such as ophthalmic lenses, are typically manufactured and sold with various coatings that impart or improve desired optical and aesthetic characteristics of the optical article. Hard-coatings and anti-reflective coatings are two coatings that are often employed in conjunction with one another on a single surface of an optical article. Hard-coatings may be formed by dip or spin coating and can be based upon organic siloxane chemistry. The hard-coating can provide improved abrasion resistance, improved mechanical durability and compatibility with anti-reflective coatings.

Anti-reflective coatings reduce reflection off the front and/or back surface of ophthalmic lenses and therefore are desirable for creating eyeglasses with improved light transmission, visibility, and aesthetics. Typically, such anti-reflective coatings are applied as a series of layers of different materials having different refractive indices. This system of layers is often referred to as a "stack." Anti-reflective coatings are typically applied to optical surfaces through physical vapor deposition techniques and machines, such as sputter coating systems and machines.

FIG. 1 shows a cross-sectional view of an ophthalmic lens 10 having a bulk lens material 8 with a front convex side 12 and a back concave side 14. The lens 10 may have a hard-coating 16 formed on a convex side 12 and on a concave side 14. The hard-coating 16 is typically in the order of several microns thick. A lens manufacturer may provide lenses with thermally cured hard-coatings on both the convex side 12 and the concave side 14 of the lens 10.

An anti-reflective coating 18 can be applied over the hard-coating 16 on both the convex side 14 and the concave side 14 of the lens 10 either by the manufacturer or by a prescription lab. The convex side 12 and the concave side 14 anti-reflective coating or stacks 18 are formed in an identical or substantially identical manner. In other words, the convex side 12 and the concave side 14 anti-reflective coatings 18 are formed of the same materials with the same number of layers having the same nominal thicknesses.

In the prescription lab, the concave side 14 of the lens 10 is often ground or surfaced to generate the desired curvature and prescription from a semi-finished ophthalmic lens. This process removes the factory applied back side thermally cured hard-coating. In order to restore some of the abrasion resistance and mechanical properties to the ground concave side of the lens lost by removal of the thermally cured hard-coating applied by the lens manufacturer, the prescription lab will most often apply an ultraviolet, UV, cured hard-coating. The above-described concave side anti-reflective coating 18 is then applied over the concave side UV cured hard-coating 16.

One problem often observed with conventional anti-reflective coated ophthalmic lenses formed as described above, is that the concave side anti-reflective coating is susceptible to crazing or cracking. The forces and pressures exerted on an ophthalmic lens during the lens edging process and during insertion of the edged lens into a lens frame are thought to lead to crazing of the concave side anti-reflective coating.

What is needed in the art is an anti-reflective coating system and method for applying the same that effectively eliminates or has increased resistance to crazing and other forms of stress induced damage.

OBJECTS AND SUMMARY OF THE INVENTION

The present invention provides an anti-reflective coating system and method that effectively eliminates or has increased resistance to crazing and other forms of stress induced damage and, in particular, has increased resistance to crazing of anti-reflective coatings applied over UV cured hard-coatings. These objectives are, in part, achieved by providing an optical article having anti-reflective properties comprising: a bulk material having a first and a second optical surface; a first anti-reflective coating formed of a plurality of layers applied over the first optical surface; and a second anti-reflective coating formed of a plurality of layers applied over the second optical surface; a reflectance of the second anti-reflective coating substantially the same as a reflectance of the first anti-reflective coating and a mechanical property of the second anti-reflective coating distinct from a mechanical property of the first anti-reflective coating.

These objectives are further achieved, in part, by providing an ophthalmic lens having anti-reflective properties comprising: a bulk lens material having a convex surface and a concave surface; a first anti-reflective coating having a plurality of layers formed over a convex first surface, at least one of the plurality of layers having a thickness greater than 100 nanometers; and a second anti-reflective coating having a plurality of high index material layers formed over the concave surface, each of the layers of the plurality of high index material layers of the second anti-reflective coating having a thickness of less than 70 nanometers.

These objectives are further achieved, in part, by providing a method for forming an optical article having anti-reflective properties comprising: applying a hard-coating on a first and a second optical surface of an optical article; forming a first anti-reflective coating over the hard-coating of the first optical surface, the first anti-reflective coating having a reflectance over a visible spectrum and a first mechanical property; and forming a second anti-reflective coating over the hard-coating of the second optical surface, the second anti-reflective coating having a substantially same reflectance over the visible spectrum as the first anti-reflective coating and a second mechanical property distinct from the first mechanical property of the first anti-reflective coating.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Figure 1:
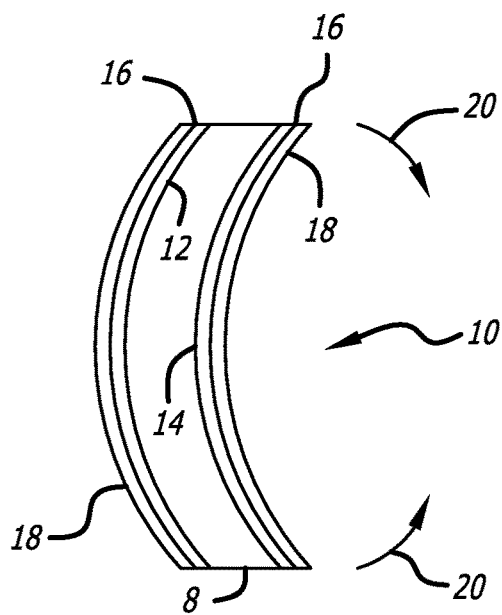
FIG. 1 is a sectional view of a coated lens.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Broadly speaking, the present invention provides anti-reflective coating systems and methods that effectively eliminate or that increases resistance to crazing of the anti-reflective coating. The present invention achieves these objectives, in part, by providing anti-reflective coating systems that are optimized for a specific surface shape of an optical article and for material stresses associated with the same. For example, the present invention provides anti-reflective coatings that are optimized for either a convex side or a concave side of an ophthalmic lens and the stresses that each side of the lens may encounter during processing and assembly of eyeglasses.

The inventors have found that the problem of crazing or failure of an anti-reflective coating applied over a hard-coating is, in part, related to and/or exacerbated by the use of ultraviolet cured hard-coatings. Both thermal and UV cured hard-coatings are based upon organic siloxane chemistry which can be considered mechanically as a mixture of a soft polymeric phase and hard glass phase, e.g. based upon silicon-oxygen bonding. To allow UV initiated cross linking to occur, the organic content in UV cured hard-coatings is greater than that of thermally cured hard-coatings. Without being limited by theory, the inventors believe this increased organic content decreases the mechanical durability of UV cured hard-coatings relative to thermally cured hard-coatings. It is believed that UV cured hard-coatings typically underperform the original thermally cured hard-coatings and are less compatible with anti-reflective coatings.

Figure 2:
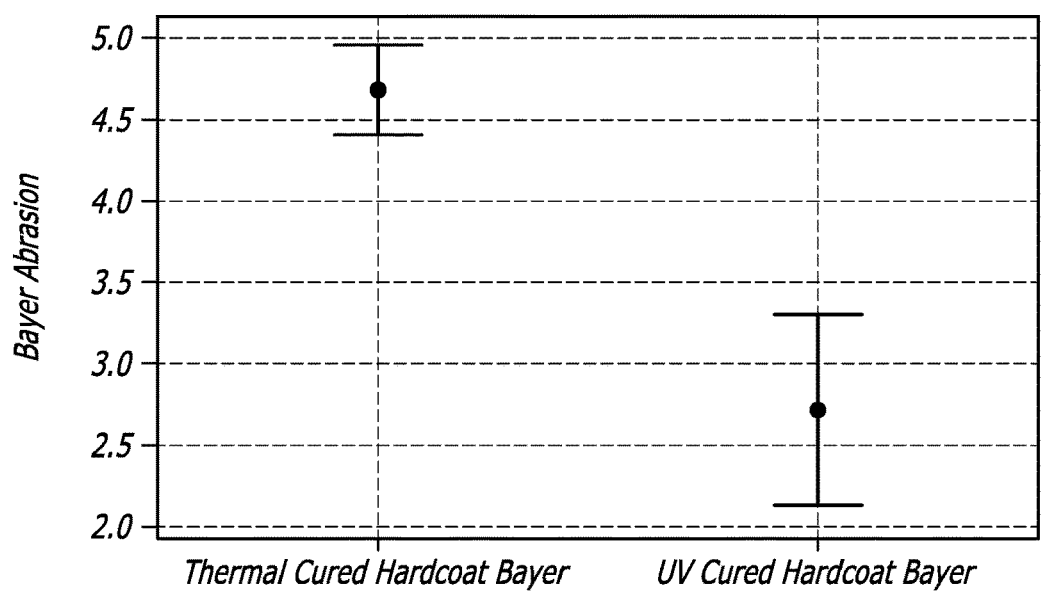
FIG. 2 is a chart showing a comparison of Bayer Abrasion of a thermal cured and an ultraviolet light cured hard-coating.

The merits of this hypothesis are evidenced in FIG. 2 which shows Bayer test results for a common thermally cured hard-coating and a common UV cured hard-coating. The Bayer test measures the durability of a material against damage by an abrasive media. A higher number represents increased abrasion resistance. Increased Bayer abrasion correlates to increased hardness and elastic modulus. It is believed that increased hardness and elastic modulus results in the formation of a better base layer or foundation upon which to form anti-reflective coatings by providing an improved transition between a bulk lens material, for example a relatively soft or compliant polymeric bulk lens material, and the relatively hard and/or inflexible material layers of an anti-reflective coating i.e. the oxide metal, metalloid, and trans-metal oxides layers of an anti-reflective coating.

While UV cured hard-coatings have limitations in mechanical robustness relative to thermally cured coatings they do offer the advantages of lower cost and ease of application. These advantages provide the motivation for there widespread use in small and medium prescription eyeglass lab settings. It is therefore very beneficial to provide anti-reflective coatings that offer improved compatibility with UV cured backside hard-coatings.

The direction of deformation applied to a lens during processing and assembly of eyeglasses is typically dictated by the overall curvature of the lens, i.e. deformation will be in a direction that will decrease the radius of the curve of the concave side of the lens. For example, arrows 20 shown in FIG. 1 indicate the typical direction of deformation of the lens 10 during processing and assembly of eyeglasses. Accordingly, deformation of the lens 10 will typically result in a coating, for example anti-reflective coating, formed on the convex side 12 of the lens 10 being subject to a tensile stress and a coating, for example an anti-reflective coating, formed on the concave side 14 of the lens 10 being subject to a compressive stress. Deformation during lab processing, such as edging or shaping, is provides a broad range of stress conditions both tensile and compressive. The ability of the hard-coating to provide support to the anti-reflective coating during these deformations combined with the resistance of the anti-reflective coating to crazing determines the risk of lens failure due to crazing. Due to the mechanical deficiencies of the UV cured hard-coatings the risk of crazing failure is increased on the back surface of a lens.

Figure 3A:
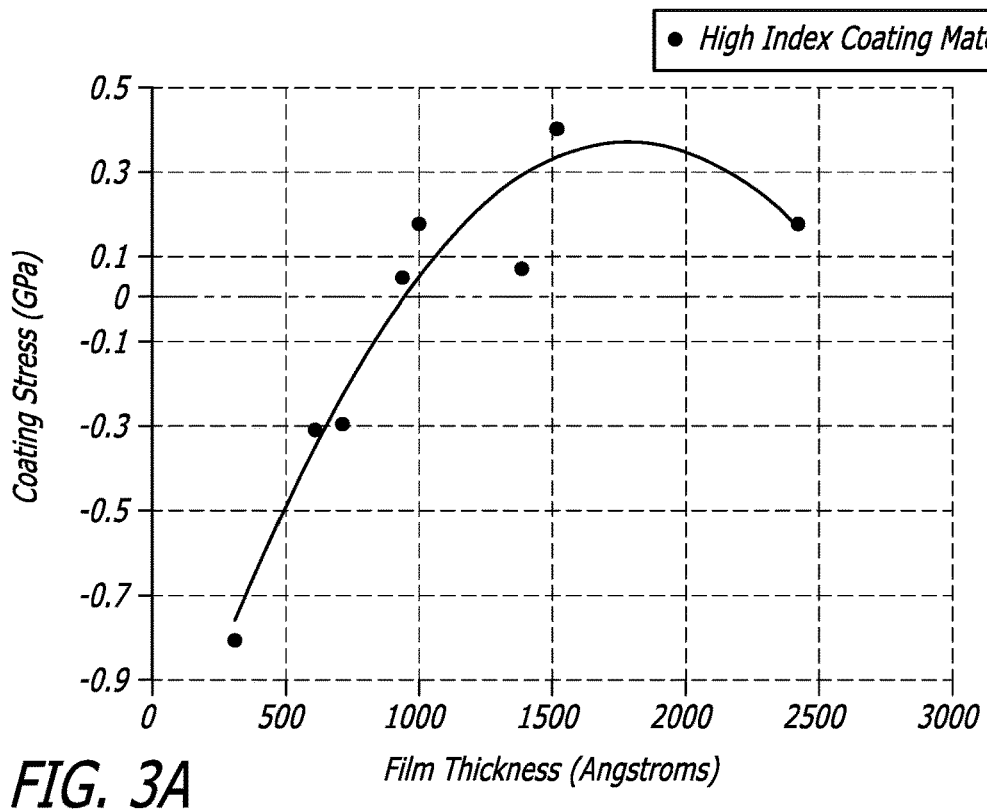
FIG. 3A is a chart showing a coating stress relative to film or layer thickness of a high index coating material.
Figure 3B:
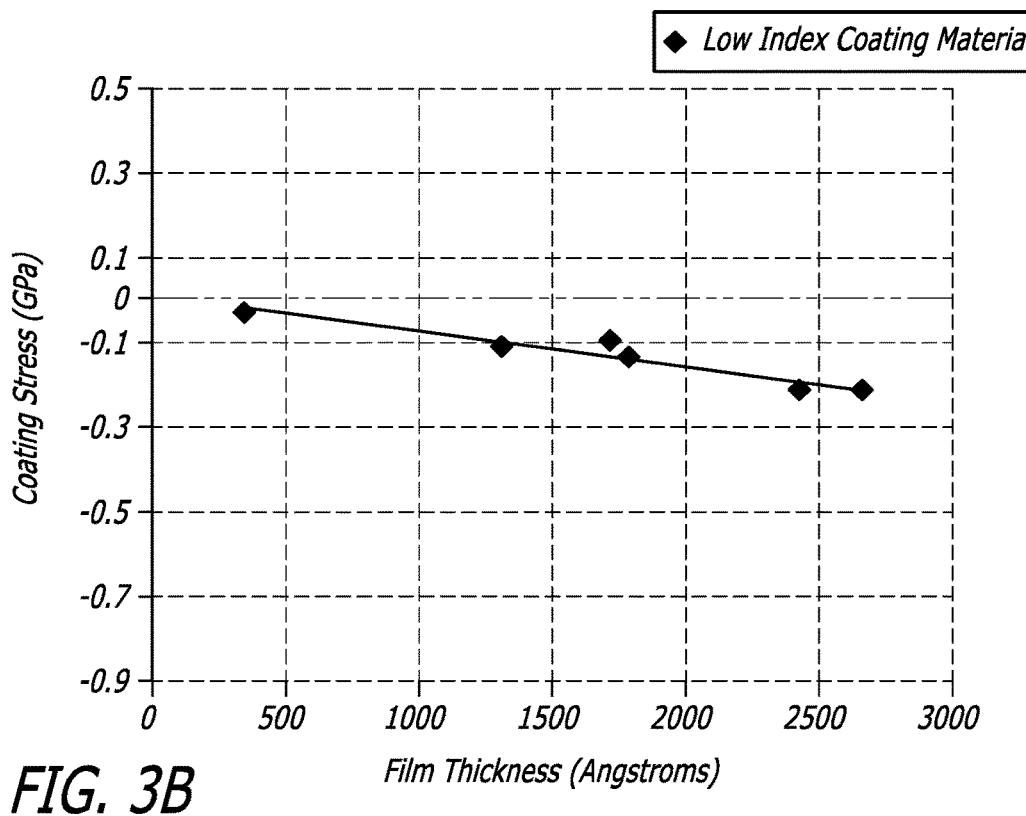
FIG. 3B is a chart showing a coating stress relative to film or layer thickness of a low index coating material.

Absent the effects of lens deformation, it has been found that different coatings and different layers within a single anti-reflective coating have different inherent stresses. For example, the stress of a high refractive index layer is shown in FIG. 3A, and the stress of a low refractive index layer is shown in FIG. 3B. The high refractive index layer stress is dependent upon the thickness of the high refractive index layer and spans a large range from compressive to tensile as the thickness of the layer increases. Crazing failure is strongly correlated to tensile stress. Therefore, in situations where crazing failure is observed it is beneficial to address any cumulative tensile stress in the layer design. In comparison, the low refractive index material stress has a much smaller variation in stress as layer thickness increases and, for the thicknesses analyzed, the stress always remains compressive. The inventors have found that such stress properties can be controlled by manipulating the design of the anti-reflective stack, the coating process employed, and the exact material or materials employed in forming the coating.

In order to eliminate crazing of the anti-reflective coatings or to increase resistance to crazing of the anti-reflective coatings, in certain embodiments of the present invention, the mechanical properties of the anti-reflective coating are manipulated by adjusting a thickness of one or more of the material layers forming the anti-reflective coating. For example, crazing failure of anti-reflective coatings is often observed on the back side of prescription lenses that were surfaced in a prescription or optical lab and subsequently coated with a UV cured hard-coating. Such coatings are mechanically inferior to factory applied thermal coatings which can lead to an increased risk of crazing of the anti-reflective coating applied over this UV cured hard-coating. To reduce the risk of crazing, in certain embodiments, the layer stack is adjusted to eliminate tensile stressed layers that are likely to cause crazing. This approach, however, is balanced against creating too large of a net compressive stress so as to result in failure due to delamination of the coating.

In certain embodiments of the present invention, the mechanical properties of the coating are manipulated by optimizing the number of layers in a coating system. In certain embodiments of the present invention, the mechanical properties of the coating are manipulated by adjusting both the thickness of the layers of a coating system and the number of layers in the coating system.

In certain embodiments of the present invention, the mechanical properties of a coating or of an individual layer is optimized by manipulation of the coating process conditions. For example, for anti-reflective coatings formed through a sputter coating process, a pressure, gas flow rates, deposition rates, and/or choice of specific materials may be manipulated so as to achieve the desired mechanical properties. In many cases, the ability to make such adjustments to the process are constrained by the limitation of the deposition equipment. This is especially true in small batch size sputter coaters where the physical space constraints limit the possible pumping speed and the achievable deposition powers. The process is further constrained by requirements for cycle time to meet throughput requirements.

Furthermore, absorbing layers of, for example silicon or zirconium, may be incorporated into the anti-reflective stack. In certain embodiments of the present invention, the number and/or thickness of these absorbing layers is manipulated so as to optimize the physical properties of the coating system as a whole for a specific application on a convex side or a concave side of a lens.

In certain embodiments, the coating system of the present invention imparts anti-reflective properties, in part, by employing alternating transparent layers of low, mid, and high refractive index materials. In this regard, high refractive index means an index of refraction that is approximately greater than about 1.9 at a referenced wavelength, for example a wavelength of about 550 nanometers. Low refractive index means an index of refraction that is approximately less than about 1.5 at a referenced wavelength, for example a wavelength of about 550 nanometers. Mid refractive index means an index of refraction approximately between about 1.5 and 1.9 at a referenced wavelength, for example a wavelength of about 550 nanometers. Low refractive index materials include, for example, silicon dioxide. Mid refractive index materials include, for example, silicon oxynitride or aluminum oxide, and high refractive index materials include, for example, titanium dioxide, tantalum pentoxide, and zirconium dioxide.

Figure 4:
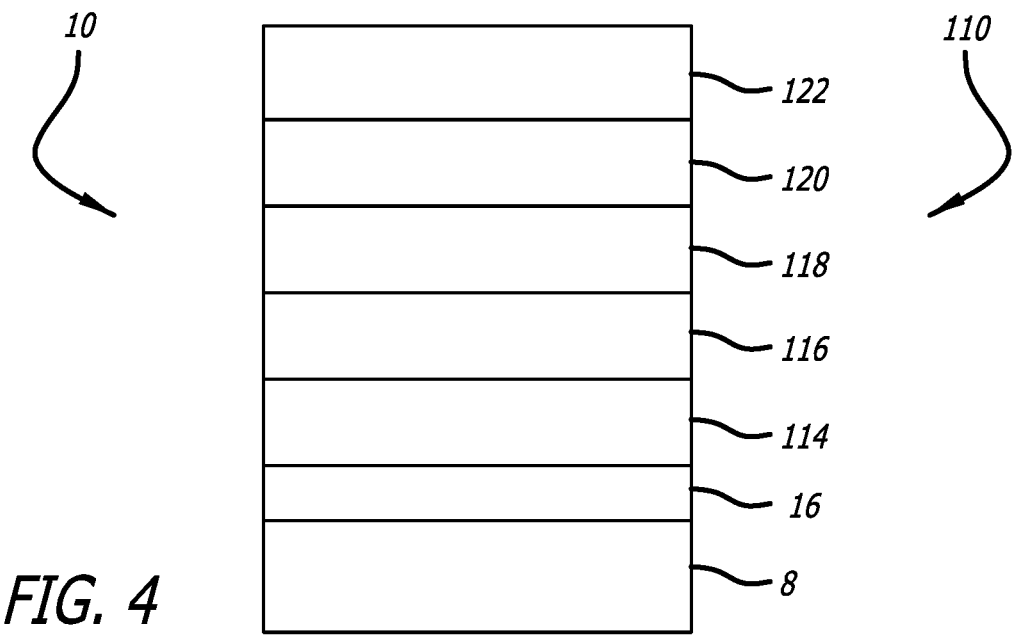
FIG. 4 is a sectional view of an optical article employing a coating according to one embodiment of the present invention.

According to certain embodiments of the present invention, as shown in FIG. 4, a lens or optical article 10 has a hard-coating 16 and an anti-reflective coating or stack 110. For the sake of clarity, the coatings or stacks disclosed herein will be described from the bottom up. That is to say the various layers of the coating or stack will be described starting from a first or bottom layer of the stack that is applied directly to an optical substrate or directly on a hard-coating and proceeding sequentially with each subsequent layer of the stack applied. In this manner, a "top layer" of the coating or stack is the last layer of the relevant coating or stack applied during the coating process.

The anti-reflective stack 110 according to the present invention has, for example, an adhesive layer 114 applied directly to a surface of the hard-coating 16 that is applied directly on a surface of the optical substrate 8. A first high refractive index layer 116 is applied directly on top of the adhesive layer 114. A first low refractive index layer 118 is applied directly on top of the first high refractive index layer 116. A second high refractive index layer 120 is applied directly on top of the first low refractive index layer 118, and a second low refractive index layer 122 is applied directly on top of the second high refractive index layer 120.

The adhesive layer 114 is, for example, formed of a silicon; silicon oxide, $SiO_x$ where x is less than or equal to two; zirconium; and/or a zirconium oxide, $ZrO_x$ where x is less than or equal to two and has, for example, a thickness of approximately 1 nanometer or less. The first high refractive index layer 116 is, for example, formed of zirconium dioxide and has a thickness of approximately 5 to 15 nanometers, for example, 12.5 nanometers. The first low refractive index layer 118 is, for example, formed of silicon dioxide and has a thickness of approximately 20 to 40 nanometers, for example, 28.7 nanometers. The second high refractive index layer 120 is, for example, formed of zirconium dioxide and has a thickness of approximately 100 to 150 nanometers, for example, 115.42 nanometers. The second low refractive index layer 122 is, for example, formed of silicon dioxide and has a thickness of approximately 60 to 100 nanometers, for example, 85.5 nanometers.

Figure 6:
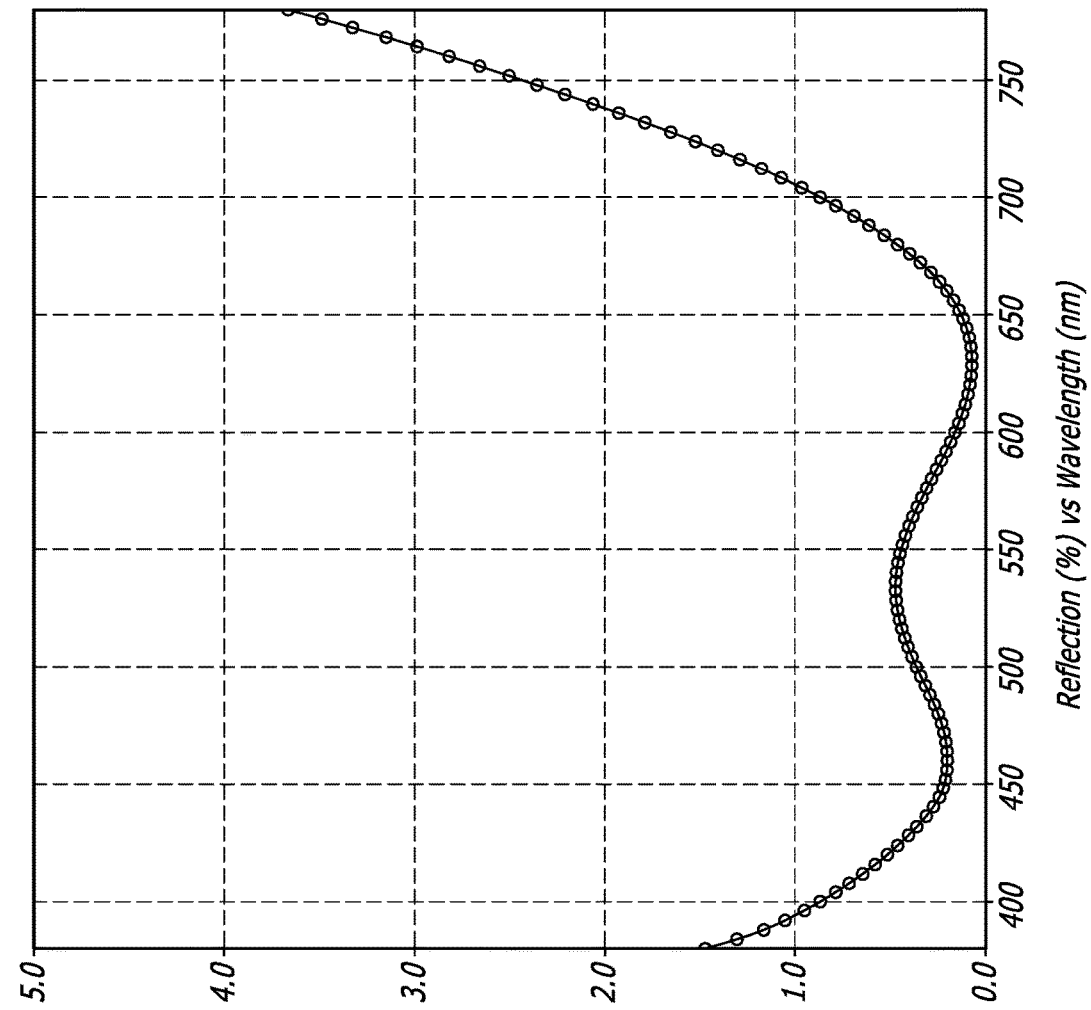
FIG. 6 is a chart showing a reflectance of a coating according to one embodiment of the present invention.

The above-described anti-reflective stack 110 provides the desired properties of a Bayer abrasion resistance greater than 1.5, resistance to crazing on a thermally cured hard-coating (lens front) combined with a reflected color of $L^*=2.94$, $a^*=-3.3$, $b^*=1.20$ achieve through a small batch sputter coater. The optical curve for the anti-reflective stack 110 is shown in FIG. 6 (single surface reflection, no backside). These achieved mechanical and optical properties are a function of the specific layer thicknesses and sequencing of the anti-reflective stack 110. It has been found that the likelihood of failure or weakness correlates, in part, to the relative thickness of the second high refractive index layer 120.

Figure 5:
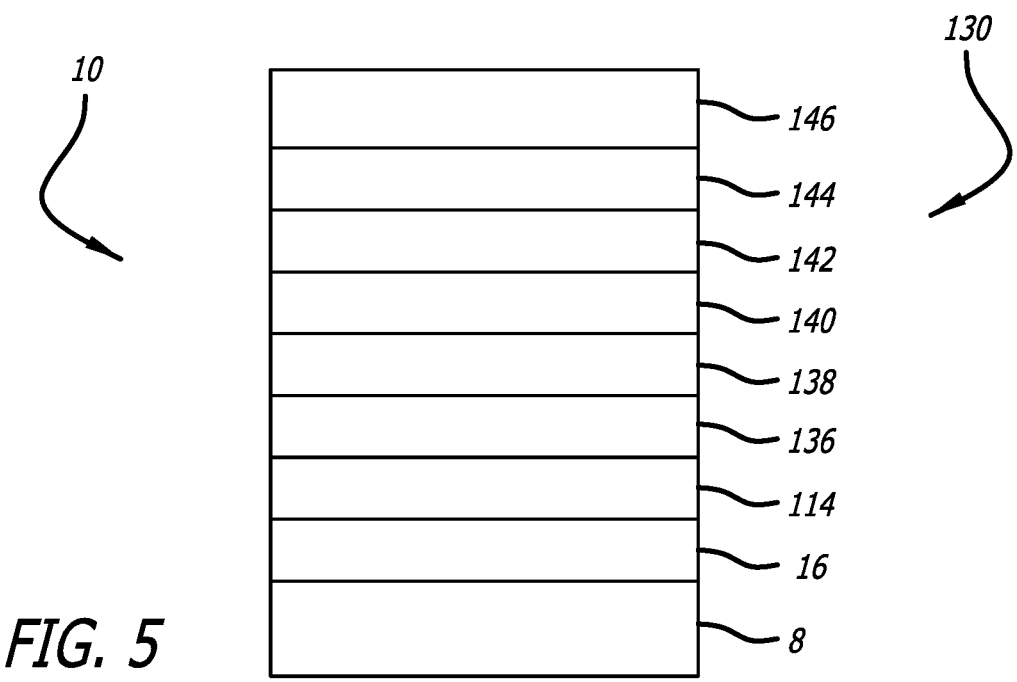
FIG. 5 is a sectional view of an optical article employing a coating according to one embodiment of the present invention.

To avoid or decrease the likelihood of anti-reflective coating failure that may occur on the concave side 14 of a lens 10 during deformation of the lens 10 in the direction of arrows 20, according to certain embodiments of the present invention, as shown in FIG. 5, an anti-reflective stack 130 is employed. The anti-reflective stack 130 has, for example, an adhesive layer 114 applied directly to a surface of the hard-coating 16 that is applied directly on a surface of the optical substrate 8. A first high refractive index layer 136 is applied directly on top of the adhesive layer 114. A first low refractive index layer 138 is applied directly on top of the first high refractive index layer 136. A second high refractive index layer 140 is applied directly on top of the first low refractive index layer 138. A second low refractive index layer 142 is applied directly on top of the second high refractive index layer 140. A third high refractive index layer 144 is applied directly on top of the second low refractive index layer 142. A third low refractive index layer 146 is applied directly on top of the third high refractive index layer 144.

In the anti-reflective stack 130, the adhesive layer 114 is as described above with respect to the anti-reflective stack 110. The first high refractive index layer 136 is, for example, formed of zirconium dioxide and has a thickness of approximately 8 to 18 nanometers, for example, 12.6 nanometers. The first low refractive index layer 138 is, for example, formed of silicon dioxide and has a thickness of approximately 20 to 40 nanometers, for example, 32.1 nanometers. The second high refractive index layer 140 is, for example, formed of zirconium dioxide and has a thickness of approximately 35 to 75 nanometers, for example, 47.4 nanometers. The second low refractive index layer 142 is, for example, formed of silicon dioxide and has a thickness of approximately 6 to 18 nanometers, for example, 11 nanometers. The third high refractive index layer 144 is, for example, formed of zirconium dioxide and has a thickness of approximately 20 to 70 nanometers, for example, 46.1 nanometers. The third low refractive index layer 146 is, for example, formed of silicon dioxide and has a thickness of approximately 60 to 100 nanometers, for example, 90.2 nanometers.

The above-described anti-reflective stack 130 provides, in part, a relatively reduced stressed coating system that will resist crazing due to a deforming stress experienced on the concave side 14 of the lens 10 during deformation of the lens 10 in the direction of arrows 20, as shown in FIG. 1. Relative to the anti-reflective coating 110 described above, this is achieved, in part, by essentially dividing the second high refractive index layer 120 of anti-reflective stack 110 in to two substantially thinner high index layers, i.e. in to the second high refractive index layer 140 and third high refractive index layer 144 that are separated by the relatively thin second low refractive index layer 142. This eliminates or reduces a source of tensile stress in the coating design that correlates to an increased risk of crazing.

Figure 7:
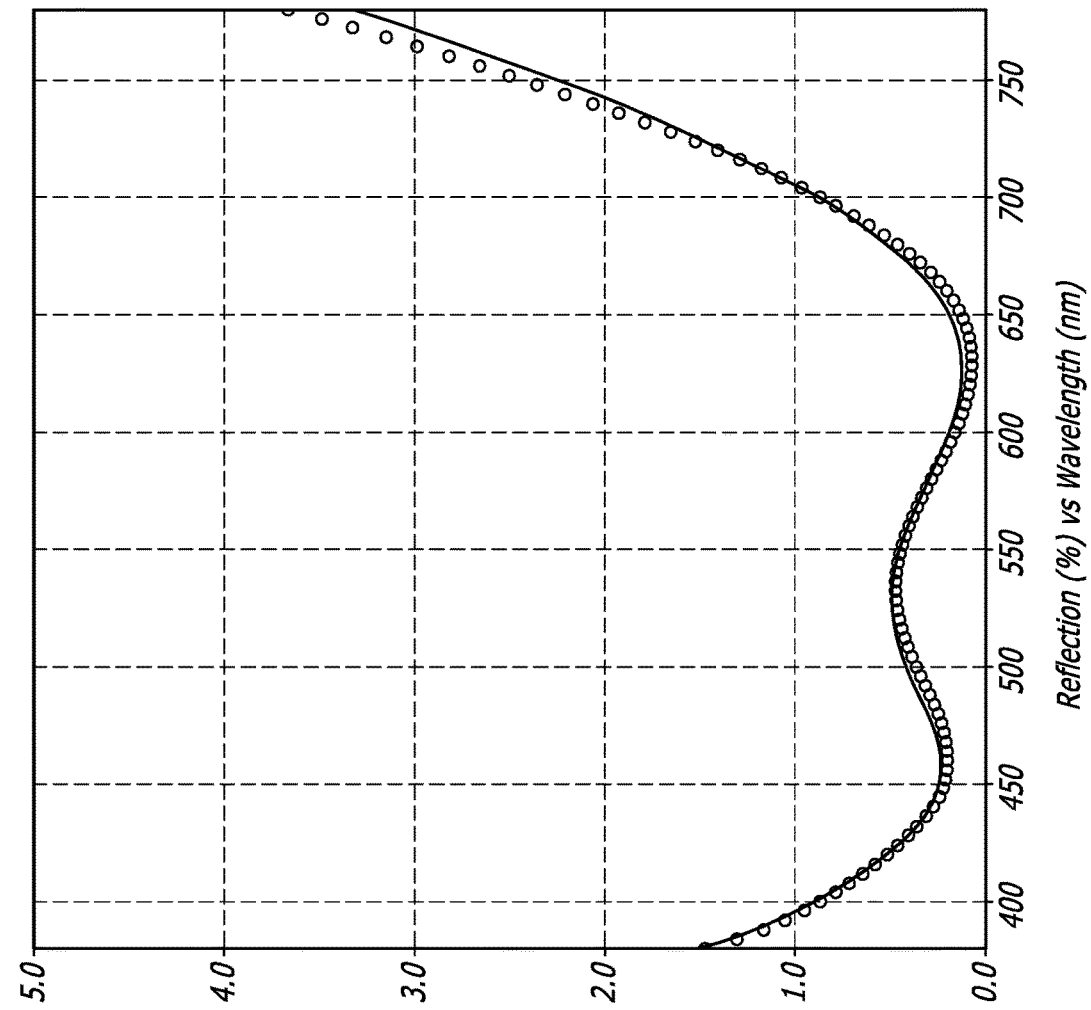
FIG. 7 is a chart showing a reflectance of a coating according to one embodiment of the present invention.

Such a design advantageously reduces the risk of crazing in anti-reflective coatings applied over UV cured hard-coatings. Accordingly, in the anti-reflective stack 130 both the thickness and the number of layers of the different refractive index materials are manipulated so as to achieve the desired physical properties. In addition to reducing the occurrence of crazing on the backside of lenses, the anti-reflective stack 130 desirably also closely matches the optical performance of the anti-reflective coating 110 described above. The optical curve for the anti-reflective stack 130 is shown in FIG. 7. The resulting color of the anti-reflective stack 130, L*=3.17, a*=-3.1, and b*=1.26, closely matches the color calculated for stack 110 with any differences beyond notice by an observer.

It will be appreciated that the above-described anti-reflective stacks are only certain examples of an anti-reflective stack according to the present invention and that variations in the number of the layers, the individual thickness of the different layers, and the various materials from which the different layers are formed are contemplated and within the scope of the present invention. In certain embodiments of the present invention, the adhesive layer 14 is omitted from the coating system 110 and/or the coating system 130.

In certain embodiments of an ophthalmic lens employing the anti-reflective stack 110 on one optical surface and the anti-reflective stack 130 on a second, different optical surface, according to the present invention, the two lens surfaces having different anti-reflective coatings nonetheless have substantially identical optical characteristics, such as reflectance over all or a substantial portion of the visible light spectrum. This is evidenced in as shown in FIGS. 6 and 7. Significantly, the substantially identical optical characteristics of the two different anti-reflective coatings or stacks is achieved concurrently with the benefit of the two different anti-reflective coatings or stack having different mechanical properties optimized for application over different types of hard-coatings and over lens surfaces having different shapes. For example, the stack 110 is optimized for application over a thermally cured hard-coating applied of a convex optical surface, and the stack 130 is optimized for application over a UV cured hard-coating applied of a concave optical surface.

It will be appreciated that any degree of differences in the reflectances between the stack 110 and the stack 130, shown in FIGS. 6 and 7 are not considered within the range of differences distinguishable by a human eye. Likewise, any degree of differences in the above-described color, e.g. L*, a*, and b*, are also not considered within the range of differences distinguishable by a human eye. Hence, for the sake of clarity, one having ordinary skill in the art will consider the reflectance and color properties of the stack 110 and the stack 130 substantially identical or substantially the same.

Furthermore, the lens 10 may further employ additional functional properties imparted by additional coatings and treatments applied over or on top of the anti-reflective stack, for example, easy-cleaning and/or hydrophobic coatings. For ophthalmic applications, in certain embodiments, a separate hydrophobic or anti-fouling layer or coating may be applied on top of the above-described alternating layers of low, mid, and high refractive index materials. This hydrophobic or anti-fouling layer or coating provides for easier cleaning and maintenance of the ophthalmic lens. For sputter applied films, a hydrophobic or anti-fouling layer or coating is typically applied by a dip process which achieves a low surface energy on the coating, i.e. achieves a water contact angle greater than 100 degrees. Such hydrophobic or anti-fouling layer or coating has a thickness in the range of approximately five to ten nanometers.

Furthermore, in certain embodiments, absorbing layers, for example layers of silicon or metal layers, may be incorporated under, within, or on the above-described anti-reflective stack. In certain embodiments of the present invention, the number and/or thickness of these absorbing layers is manipulated so as to optimize the physical properties of the coating system as a whole and/or for a specific application on a convex side or a concave side of a lens.

In certain embodiments of the present invention, the convex and concave side anti-reflective coatings of a lens are designed or configured independently and distinct from one another so as to resist damage caused by the different types of stress most likely to be encountered by the individual coatings while achieving the desired optical reflectance, abrasion resistance, and/or mechanical robustness.

In certain embodiments of the present invention, the convex and concave side anti-reflective coatings on a lens are designed or configured independently and distinct from one another so as to better suit the mechanical properties of the underlying convex and concave side hard-coatings, thereby providing the optimum combination of optical performance, abrasion resistance, and/or mechanical robustness.

For the sake of clarity, the distinct and/or optimized convex side and concave side anti-reflective coating configurations of the present invention may be employed separately, e.g. a lens may employ only a convex side or only a concave side specific coating system according to the present invention, or the distinct convex side and concave side coating configurations of the present invention may be employed in conjunction with one another on different optical surfaces of a single lens.

In one embodiment of a coating method according to the present invention a plastic lens is coated using a sputter tool designed with a small footprint suitable for use in a small prescription processing lab. Aspects of such a sputter system are detailed in the assignee's U.S. Publication No. 2014/0174912 which is herein incorporated by reference in its entirety. The relatively small footprint of such a machine limits the number of sputter targets, or materials, to a maximum of two. The targets are formed of metallic-type materials and oxygen is added during processing to form the desired substantially transparent dielectric layers of low, mid, and/or high refractive index oxide materials. One target is used to form a low index material, such as silicon dioxide, from a silicon target exposed to oxygen gas. The other target is used to form a high index material, such as zirconium dioxide, from a zirconium target exposed to oxygen gas. A plasma source in the system provides an activated oxygen plasma to assist in the formation of the absorptive free oxide layers.

At the start of the sputter process, the lens to be coated is transferred into the coating chamber. At a chosen pressure, typically below $5 \times 10^{-5}$ mbar a mixture of argon, and oxygen are passed into the chamber by mass flow controllers. The plasma source is energized to form a plasma in order to treat the lens surface increasing the adhesion of deposited film material to the lens. Following plasma cleaning, an adhesion layer of silicon is deposited at an argon flow of 40 standard cubic centimeters per minute, SCCM, and a power of 1500 watts. No oxygen is added into the process which allows the formation of a silicon film with minimal oxygen incorporation. The thickness of this layer is set by the deposition time. Typically a film thickness of less than one nanometer is deposited. On top of this layer alternating layers of low and high index material are deposited to prescribed thicknesses using a suitable process such as pulsed direct current reactive sputtering.

The low and high index materials are deposited at powers sufficient to achieve the desired cycle time while not causing unwanted heating of the lens. A typical power level is 1458 watts for a target approximately six inches in diameter. For the silicon dioxide film formation from a silicon target, 16 SCCM of oxygen is added to the plasma source running a discharge current of 300 milliamps at a voltage of near 250. Argon is supplied to the sputter head at a flow rate of 10 SCCM. The result is a high quality transparent silicon dioxide film using a process compatible with most plastic lenses. For the zirconium dioxide film formation from a zirconium target, 20 SCCM of oxygen is added to the plasma source running a discharge current of 300 milliamps at a voltage of near 250. Argon is supplied to the sputter head at a flow rate of 20 SCCM. The result is a high quality transparent zirconium dioxide film formed from a process compatible with most plastic lenses. The individual layer thicknesses are set by the coating design, as understood by anyone skilled in the art. These thicknesses will vary depending upon the desired design and the number of layers may vary, typically between four and seven, with the total coating thickness of between 200 and 500 nanometers. The process conditions described above provide an example for reference only and may vary depending upon the materials employed, the desired film properties, and the coating machine employed.

In certain embodiments, the coating system of the present invention is formed and optimized for specific applications by manipulating the deposition conditions employed in forming the coating system. For example, deposition conditions of each of the different target materials is varied to achieve the desired reflectance, transmission, absorbance, anti-static, and mechanical properties of the resulting coating system. Specific coating stresses can be manipulated or optimized by controlling a number of coating process factors including but not limited to: sputter gas, pressure, deposition rate, oxidation state, e.g. formation of suboxides, and temperature. Often other constraints limit the accessible range of parameters. For example, many substrate materials such as plastic cannot survive deposition at elevated pressure, pumping speed may limit accessible pressure ranges, magnetron design will determine cooling and therefore power limitation, and cost will limit available power supplies which limits the maximum attainable deposition rate.

It will be appreciated that deposition conditions or parameters are numerous for different sputtering techniques and machines, and meaningful deposition parameters and/or figures can often only be supplied for one given deposition system or machine. Accordingly, for any given system, a skilled operator will appreciate that it will be necessary to determine the variation of the desired properties of a coating as a function of the specific deposition conditions of the deposition machine employed. The system parameters that may alter from one machine to the next include: the geometry of the deposition chamber, the target size, the power applied to the target, the target voltage, the distance between the substrate and the target, the target composition, gas flow-rates, pumping speed, total pressures, and the like.

In certain embodiments, coatings according to the present invention are applied to optical substrates and articles, for example, ophthalmic lenses, windows, safety goggles, shields, and sun glasses. The coating system of the present invention is applied to a front, a back or a front and back surface of the optical article. The ophthalmic lenses may, for example, be a finished or unfinished lens and/or a single or multifocal lens. The optical article can, for example, be formed of glass, crystalline quartz, fused silica, or soda-lime silicate glass. In an alternative embodiment, the optical article is formed of a plastic bulk material or resin suitable for cast or injection molding. For example, such materials include polymers based on allyl diglycol carbonate monomers (such as CR-39 available from PPG Industries, Inc. and SPECTRALITE and FINALITE Sola International Inc.) and polycarbonates (such as LEXAN available from General Electric Co.).

Such optical articles may be transparent or may employ an active or static coloring substrate mixed directly into the bulk material or resin. Such optical articles may further employ additional functional characteristics in the form of coatings, laminates, thin film inserts, and/or thin film laminates. The functional attributes of such films, laminates, or coatings may include, for example, coloration, tinting, hard coating, polarization, photochromism, electrochromism, UV absorption, narrow band filtering, easy-cleaning, hydrophobicity, and anti-static.

EXAMPLES

In order to evaluate the benefits of the present invention, 9 lenses were prepared with the anti-reflective stack 110 applied to a concave side of the lenses, and a second set of 6 lenses were prepared with the anti-reflective stack 130 applied to a concave side of the lenses. In all cases, the lenses were identical 6 base lenses with no power (i.e. 6 base front and back). The center thickness of the lenses was approximately 1.7 mm. The anti-reflective stacks 110 and 130 were applied directly over a UV cured hard-coating. The lenses were subjected to increasing compression around an outside circumference of the lenses in the general direction of the arrows 20 shown in FIG. 1. Constant pressure was applied to each lens until crazing was observed in the concave side anti-reflective coating of the lens. The maximum local curvature of each lens during the deformation was measured using a lens clock and recorded. Since the lenses were all the same diameters and thickness a greater recorded curvature of a lens at the point of crazing correlates to a greater force applied to the lens to generate the curvature. The test, therefore, provides a metric to compare crazing resistance of different coatings on otherwise similar lenses under conditions that may occur during the processing of lenses and assembly of eyeglasses in prescription labs, for example during edging of a lens or insertion of a lens into a frame.

Figure 8:
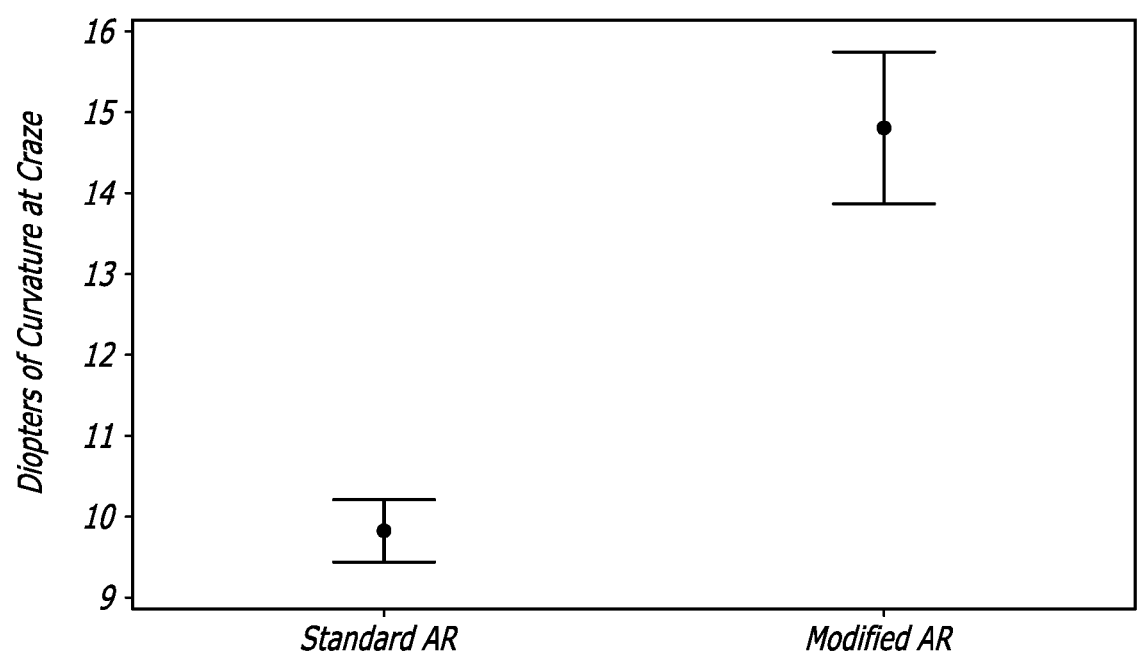
FIG. 8 is a chart showing a resistance to crazing for coatings according to certain embodiments of the present invention

FIG. 8 shows the average results of the two sample lens sets tested. As clearly indicated by the results, the anti-reflective stacks or coating systems 110 and 130 exhibit significantly distinct resistances to crazing. More particularly, the anti-reflective stack 130 showed a greater resistance to crazing relative to that of the anti-reflective stack 110. Hence, anti-reflective stack 130 advantageously provides improved resistance to crazing when employed in a surface of an optical article subjected to a compressive force.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A method for forming an optical article having anti-reflective properties comprising:
    applying a hard-coating on a first and a second optical surface of an optical article;
    forming a first anti-reflective coating over the hard-coating of the first optical surface, the first anti-reflective coating having a reflectance over a visible spectrum and a mechanical property; and
    forming a second anti-reflective coating over the hard-coating of the second optical surface, the second anti-reflective coating having a substantially same reflectance over 400 nm to 780 nm as the reflectance of the first anti-reflective coating, substantially the same color as the first anti-reflective coating, and a mechanical property distinct from the mechanical property of the first anti-reflective coating.

2. The method of claim 1 wherein the step of applying a hard-coating on an optical surface of an optical article comprises applying a UV cured hard-coating over a concave second optical surface.

3. The method of claim 1 wherein the step of forming a first anti-reflective coating over the hard-coating of the first optical surface comprises applying a layer of zirconium dioxide having a thickness greater than 100 nanometers.

4. The method of claim 1 wherein the step of forming a second anti-reflective coating over the hard-coating of the second optical surface comprises applying a plurality of layers of zirconium dioxide wherein each layer of the plurality of layers of zirconium dioxide has a thickness less than 75 nanometers.

5. The method of claim 1 wherein the step of forming a second anti-reflective coating over the hard-coating of the second optical surface comprises forming the second anti-reflective coating to substantially resist crazing when the second optical surface is exposed to a change in diopter of greater than 5 diopter due to a compressive force applied to the optical surface.

6. The method of claim 1 wherein the step of forming a second anti-reflective coating over the hard-coating of the second optical surface comprises forming the second anti-reflective coating with a total of six layers of a high, mid, and/or low refractive index material.

7. A method for forming an optical article having anti-reflective properties comprising:
    applying a first hard-coating over a first side and a second side of an optical article;
    applying a first anti-reflective stack over the hard-coating on the first side of the optical article; and,
    applying a second anti-reflective stack over the hard-coating on the second side of the optical article; said second anti-reflective stack being mechanically distinct from said first anti-reflective stack;
    wherein a first reflection spectrum of the first side of the optical article is substantially the same as a second reflection spectrum on the second side of the optical article;
    wherein the first anti-reflective stack comprises fewer total layers of a high, mid, and/or low refractive index material than the second anti-reflective stack.

8. The method of claim 7, wherein the optical article comprises an allyl diglycol carbonate monomer.

9. The method of claim 7, wherein the optical article comprises polycarbonate.

10. The method of claim 7, further comprising an optically functional laminate.

11. The method of claim 7, wherein the first hard-coating comprises a thermally cured hard-coating and the second hard-coating comprises a UV cured hard-coating.

12. The method of claim 7, wherein the first anti-reflective stack comprises at least one layer formed of a high refractive index material having a thickness greater than approximately 100 nanometers.

13. The method of claim 7, wherein the second anti-reflective stack substantially resists crazing when the concave optical surface is exposed to a change in diopter of greater than 5 diopter due to a compressive force applied to the optical article.

* * * * *